United States Patent [19]
Kalnitsky et al.

[11] Patent Number: 5,982,608
[45] Date of Patent: Nov. 9, 1999

[54] SEMICONDUCTOR VARIABLE CAPACITOR

[75] Inventors: Alexander Kalnitsky, San Francisco; Alan Kramer, Berkeley; Vito Fabbrizio, El Cerrito; Giovanni Gozzini, Berkeley; Bhusian Guptz, Palo Alto Santa Clara; Marco Sabatini, Berkeley, all of Calif.

[73] Assignee: STMicroelectronics, Inc., Carrollton, Tex.

[21] Appl. No.: 09/006,269

[22] Filed: Jan. 13, 1998

[51] Int. Cl.$^6$ .......................... H01G 5/01; H01G 5/011; H01G 5/013
[52] U.S. Cl. .................. 361/288; 361/287; 361/277; 361/280; 361/283.1; 361/283.4
[58] Field of Search ................................. 361/277, 278, 361/279, 280, 283.1, 283.2, 283.3, 283.4, 287, 288, 289, 291

[56] References Cited

U.S. PATENT DOCUMENTS

| | | |
|---|---|---|
| 4,495,820 | 1/1985 | Shimada et al. ................ 73/724 |
| 4,672,849 | 6/1987 | Hoshino ........................ 73/579 |
| 5,325,442 | 6/1994 | Knapp .......................... 382/4 |

*Primary Examiner*—Kristine Kincaid
*Assistant Examiner*—Eric W. Thomas
*Attorney, Agent, or Firm*—Theodore E. Galanthay; Lisa K. Jorgenson; Peter J. Thoma

[57] ABSTRACT

A variable capacitor in a semiconductor device is described in which the capacitance is varied by the movement of a dielectric material in the space between the plates of the capacitor in response to an external stimulus. A method of making such a variable capacitor is also described in which the capacitor is built in a layered structure with the top layer including a portion of dielectric material extending into the space between the capacitor plates. After formation of the top layer, an intermediate layer is etched away to render the top layer flexible to facilitate movement of the dielectric material in the space between the capacitor plates.

15 Claims, 5 Drawing Sheets

SEMICONDUCTOR VARIABLE CAPACITOR

BACKGROUND OF THE INVENTION

The present invention relates generally to semiconductor devices, and more particularly to the incorporation of a variable capacitor as an element of an integrated circuit formed on a common semiconductor substrate.

Variable capacitors commonly employ moveable plates that vary the capacitance by varying the amount of overlap of adjacent parallel plates or the distance separating two opposed parallel plates. Integrating such variable capacitors with a moving plate as part of a semiconductor device poses certain problems due to the inherent limitations of semiconductor device fabrication. Examples of variable capacitors integrated on a semiconductor substrate are described in U.S. Pat. Nos. 4,495,820 and 4,672,849, each of which discloses a device that senses changes in distance between a moveable plate and a fixed plate. The present invention departs from the moveable plate approach of these prior patents to achieve a simplified structure and fabrication process for making a semiconductor variable capacitor.

SUMMARY OF THE INVENTION

The present invention provides a variable capacitor integrated in a semiconductor device, which is suitable for use in vibration sensors, accelerometers, pressure sensors, and acoustic transducers. The capacitance of the variable capacitor is varied by moving a membrane of dielectric material in a gap between fixed plates of a capacitor. Changes in capacitance are affected by changing the dielectric value in the gap between the fixed plates.

The variable capacitor of the present invention can be integrated in a semiconductor device using conventional fabrication techniques and materials in a unique sequence of steps that builds up a layered structure including spaced-apart fixed plates and a dielectric membrane moveable in the space or gap between the plates.

The novel features believed characteristic of the invention are set forth in the appended claims. The nature of the invention, however, as well as its essential features and advantages, may be understood more fully upon consideration of an illustrative embodiment, when read in conjunction with the accompanying drawings, wherein:

BRIEF DESCRIPTION OF THE DRAWINGS

FIG. 1 includes a cutaway in an upper surface portion of the variable capacitor to illustrate underlying features of the structure.

FIG. 10 shows sub-surface features using dashed lines.

DESCRIPTION OF THE PREFERRED EMBODIMENTS

Figure 1:
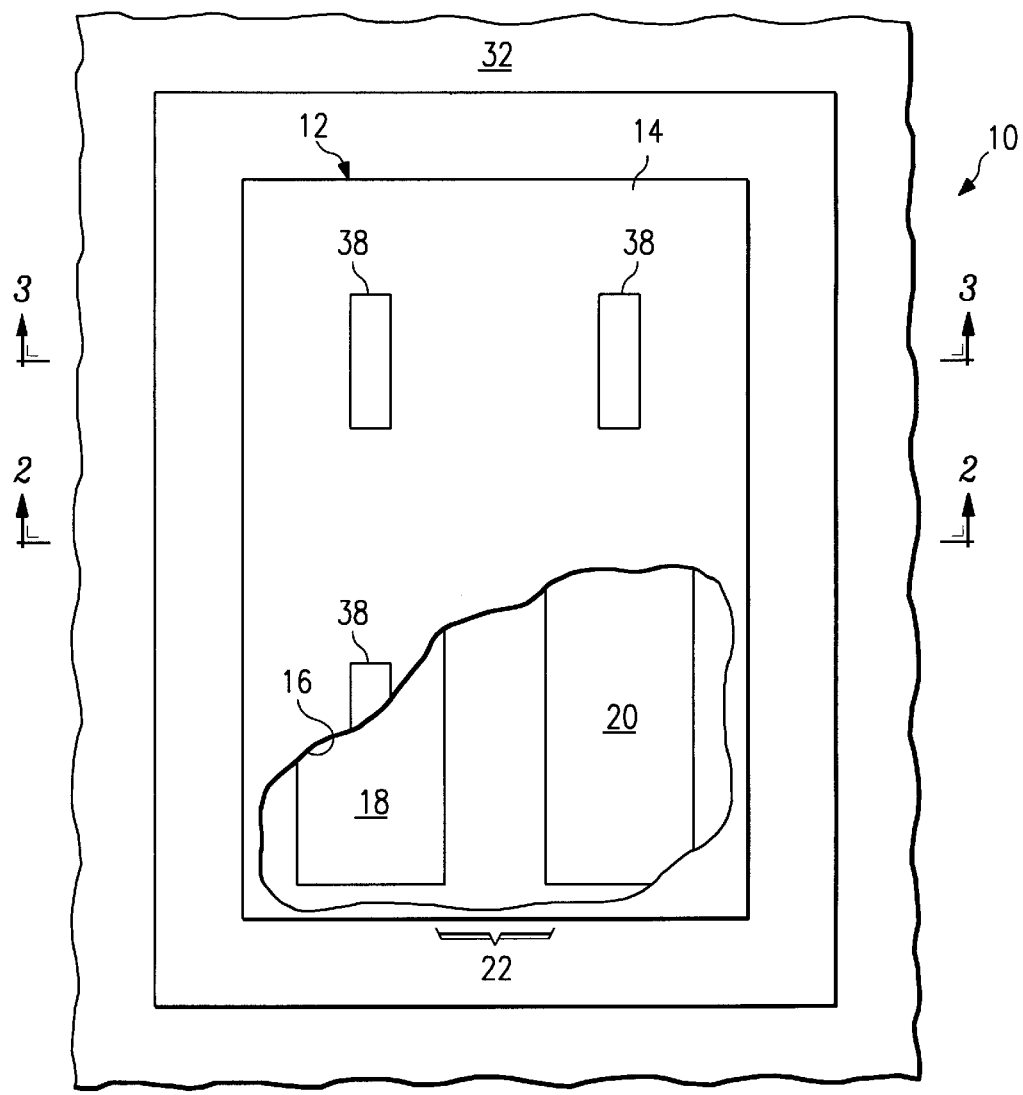
FIG. 1 is a schematic plan view of a variable capacitor in a semiconductor device according to one embodiment of the present invention.

Referring to FIG. 1, a portion of a semiconductor device is indicated generally by reference numeral 10, the portion 10 including a variable capacitor 12 fabricated according to the present invention. The variable capacitor 12 has a flexible membrane 14, which is shown with a cutaway 16 to reveal underlying features including a first elongated conductor 18 spaced parallel to a second elongated conductor 20. The space between the conductors 18 and 20 defines a gap 22, and the conductors form the plates of the variable capacitor 12, which may be connected to other circuit elements (not shown) of the device 10, as will be described below. It will be appreciated that other layouts, including by way of example interdigitated first and second conductors and interconnected arrays of conductors, can be used to increase the capacitance of a variable capacitor made according to the present invention.

Figure 2:
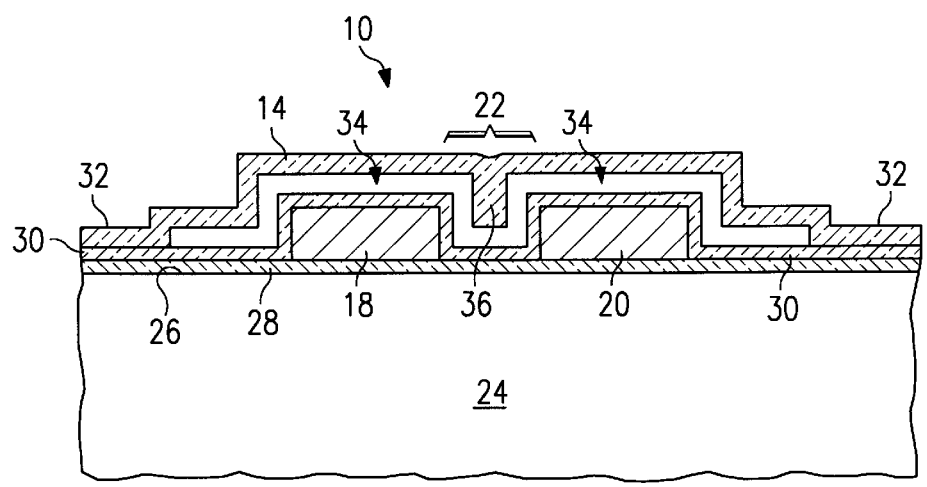
FIG. 2 is a schematic cross-section of the variable capacitor depicted in FIG. 1 taken at section 2—2 in FIG. 1, in which a flexible membrane is shown in its unflexed position.

Referring to the cross-section of FIG. 2, the device 10 is formed on a semiconductor substrate 24, which is preferably a conventional silicon substrate and may have a contentional shallow epitaxial layer defining an upper surface region thereof. The substrate 24 has a top surface 26 on which a first insulating layer 28 is formed. The first insulating layer 28 is preferably an oxide layer, but may be any dielectric material, or may be a composite layer of two or more layers of which at least the top layer is a dielectric material.

The first and second conductors 18 and 20, which are preferably aluminum, lie atop the oxide layer 28. A second insulating layer 30, which preferably is silicon nitride, overlies the first and second conductors 18 and 20 and the portions of the oxide layer 28 not covered by the conductors 18 and 20. The second insulating layer 30 conforms to the top and side surfaces of the conductors 18 and 20.

The flexible membrane 14 is a dielectric material and preferably comprises silicon nitride. Alternatively, it may comprise a polyimide layer. The flexible membrane 14 has a peripheral portion 32, which is supported through intermediate layers by the semiconductor substrate 24. The membrane 14 and the underlying nitride layer 30 defame a cavity 34 therebetween. The cavity 34 extends side-to-side to the periphery 32 of the membrane 14 both in the direction along the cross section of FIG. 2 as well as in the direction perpendicular thereto, as will be appreciated from FIG. 1.

Figure 2A:
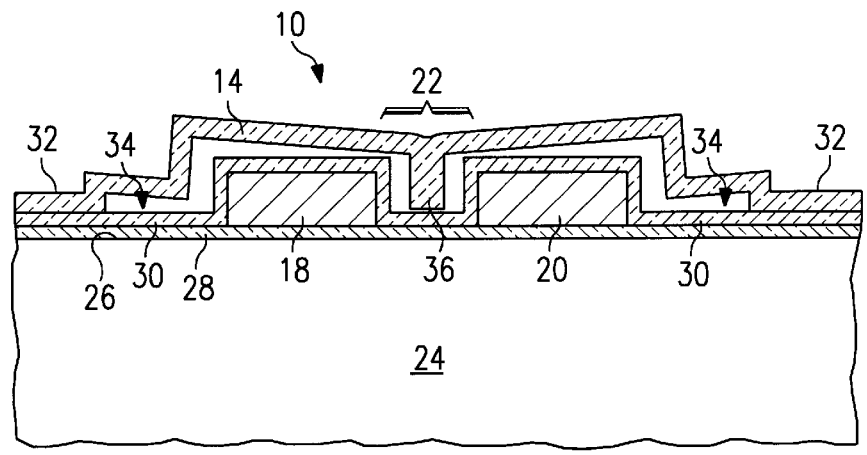
FIG. 2A is a schematic cross-section similar to FIG. 2 showing the flexible membrane in a fully flexed position.

With further reference to FIG. 2, the membrane 14 includes a beam 36 that extends partially into the gap 22 between the first and second conductors 18 and 20. Because the membrane 14 is flexible, the beam 36 is moveable within the gap 22. FIG. 2A shows the membrane 14 in its fully flexed position with the beam 36 extending down into the gap 22 and abutting the top surface of the nitride layer 30. Openings or ports 38, shown in FIGS. 1 and 3, are provided in the membrane 14 to allow air to move into and out of the cavity 34 facilitating movement of the membrane 14.

When an external stimulus is applied to the membrane 14, the beam 36 moves up and down in the gap 22, thereby changing the dielectric property between the first and second conductors 18 and 20. Since the gap 22 is essentially air, the dielectric value of the variable capacitor 12 changes as the beam 36 moves in the gap 22, thereby changing the capacitance in proportion to the movement of the beam 36.

Figure 3:
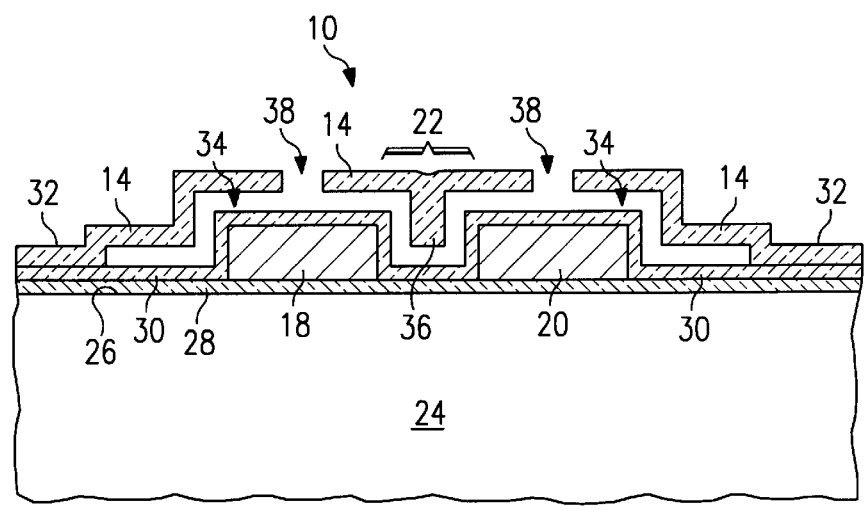
FIG. 3 is a schematic cross-section of the variable capacitor depicted in FIG. 1 taken at section 3—3 in FIG. 1.
Figure 3A:
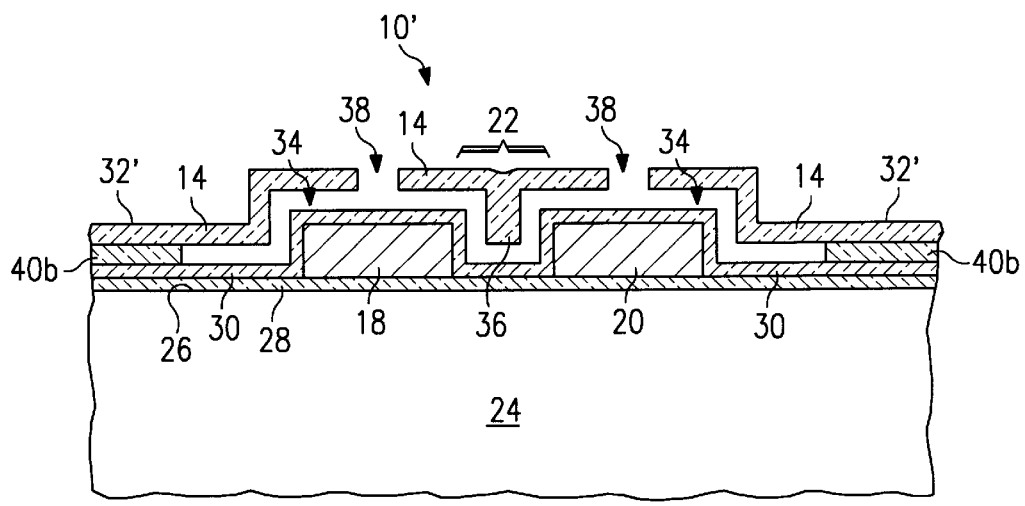
FIG. 3A is a schematic cross-section similar to FIG. 3 but showing a slightly changed structure resulting from a process variation according to the present invention.

Referring to FIG. 3, the membrane 14 is rigidly supported at its periphery 32. In this embodiment the membrane's periphery 32 lies directly atop a portion of the underlying nitride layer 30. Another embodiment of the device is shown in FIG. 3A, in which the membrane's periphery, which is designated by reference numeral 32', lies atop an intermediate insulating layer 40b, which in turn lies atop nitride layer 30. The device 10' of FIG. 3A results from a process variation that is described below.

Figure 4:
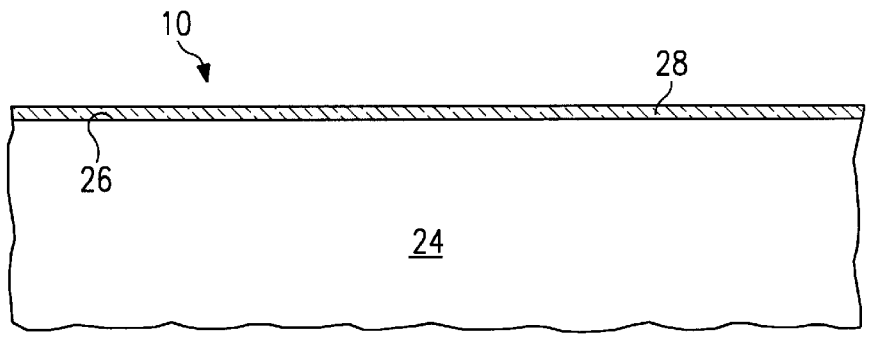
FIGS. 4–9 are cross-sectional views similar to FIG. 3 showing the structure at various stages in a process for making the device, the thickness dimensions of the various elements not being to scale.

FIG. 4 shows the structure of the variable capacitor of the present invention at an early stage in the preferred manufacturing process. The insulating layer 28 is formed on the semiconductor substrate 24 to a desired thickness, which may be up to several microns in thickness depending on the location of the variable capacitor in the device structure and process requirements for other circuit elements fabricated as part of the same semiconductor device. The insulating layer 28 may be a relatively thin oxide layer deposited or grown directly on the substrate 24 using conventional processing techniques. Alternatively, layer 28 may be part of a relatively thick conventional field oxide. Furthermore, layer 28 may be a composite of several layers, the top most being an oxide or other dielectric layer. It will also be appreciated that layer 28 may be formed above other active elements (not shown) of the device 10.

Figure 5:
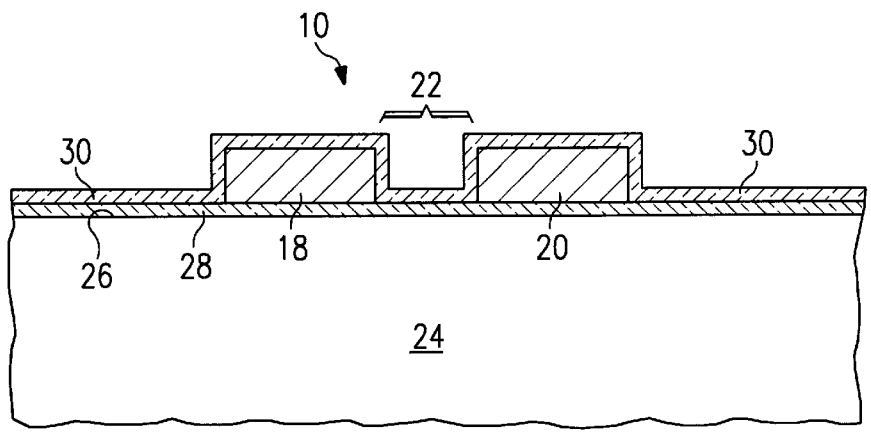

Referring to FIG. 5, a conductive layer of about 0.5 to 3 microns in thickness is formed on the structure, preferably by conventional aluminum deposition. Then, selected portions of the conductive layer are anisotropically etched using conventional patterning techniques to form the first conductor 18 and the second conductor 20, and defining the gap 22 therebetween. Anisotropic etching is preferred because it produces substantially straight vertical edges for the conductors 18 and 20, which is advantageous for forming the facing surfaces of the capacitor plates of the variable capacitor of the present invention. Next, the second insulating layer 30 is formed over the structure, resulting in the structure depicted in FIG. 5. This is preferably accomplished by a conventional silicon nitride deposition.

Figure 6:
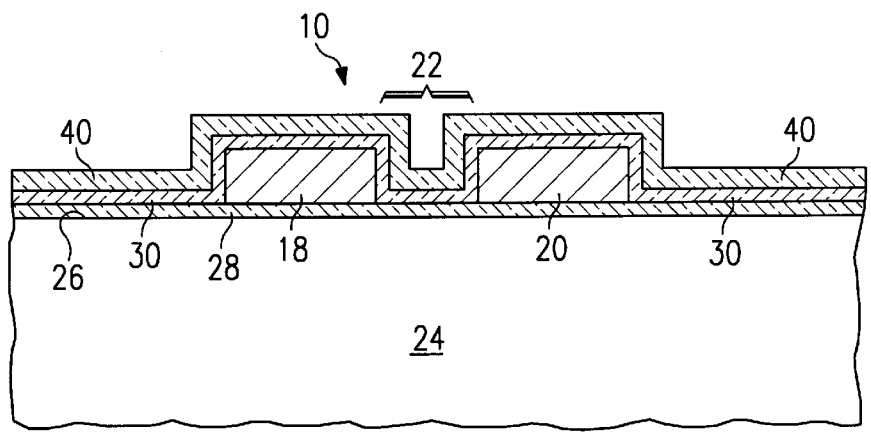

Referring now to FIG. 6, a third insulating layer 40 is then formed on the second insulating layer 30. Preferably, the third insulating layer 40 is phosphosilicate glass (PSG) and is deposited to a thickness of about 2 to 10 kÅ. PSG is selected as the preferred material for the third insulating layer 40 because it etches at a relatively fast rate. Also, standard wet etching using hydrofluoric acid preferentially etches PSG without significantly affecting silicon nitride.

Figure 7:
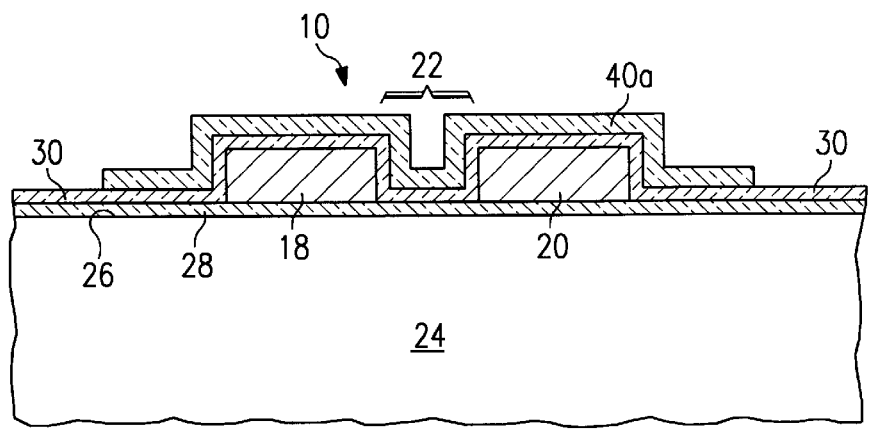

Portions of the third insulating layer 40 are then selectively etched at the periphery, as depicted in FIG. 7, using conventional photolithographic techniques, leaving a PSG layer 40a intact.

Figure 8:
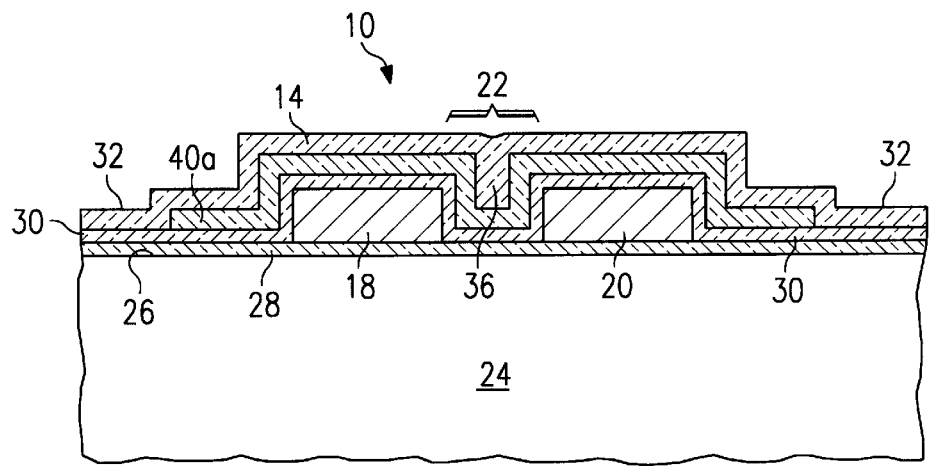

Next, referring to FIG. 8, the membrane 14 is formed over the structure, preferably by depositing silicon nitride to a thickness of about 3 to 10 kÅ. The silicon nitride membrane 14 conforms to the surfaces of the PSG layer 40a so as to form the beam 36 as shown.

Figure 9:
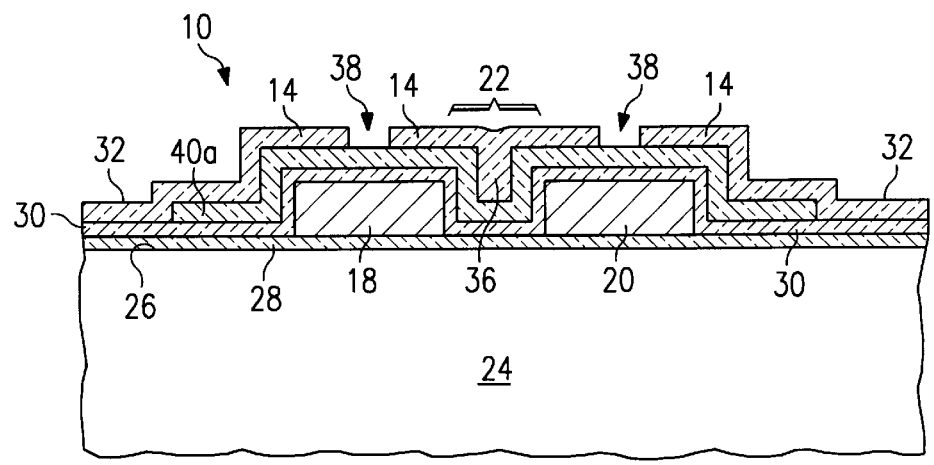

Referring to FIG. 9, portions of the membrane 14 are selectively etched away using conventional patterning techniques to form the ports 38 in the membrane 14, and in so doing expose underlying portions of the PSG layer 40a. Thereafter, the PSG layer 40a is laterally etched, preferably using a standard hydrofluoric acid wet etch solution introduced through the ports 38, to form the cavity 34 as shown in FIG. 3. The removal of the PSG layer renders the membrane 14 flexible so that the beam 36 is moveable up and down in the gap 22 between the first and second conductors 18 and 20.

In a variation of the process according to the present invention, the photolithographic patterning and etching steps for producing the structure of FIG. 7 can be eliminated. The silicon nitride for making the membrane 14 can be deposited on the structure of FIG. 6 and the process continued in the same manner thereafter. When PSG layer 40 is laterally etched beneath the membrane 14, the etch duration is controlled so that the PSG is fully etched in the gap 22 and beneath the beam 36, and then halted. After the resulting space 34 has been flushed out, the structure will appear as shown in FIG. 3A. A portion 40b of the original PSG layer will remain under the periphery 32' of the membrane 14. The etch duration determines where the edge of the remaining PSG layer 40b will be located, and thus have some effect on the flexibility of the membrane 14. The decision whether to include the procedure of FIG. 7 or leave it out will depend on device design and process cost considerations.

Figure 11:
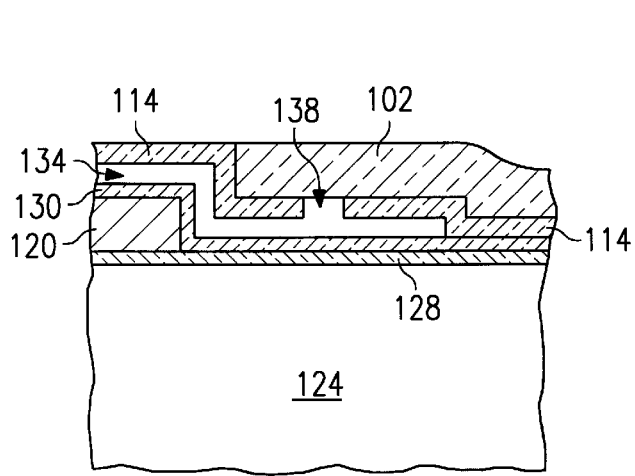
FIG. 11 is a schematic cross-section of a portion of the variable capacitor depicted in FIG. 10 taken at section 11—11 in FIG. 10.
Figure 10:
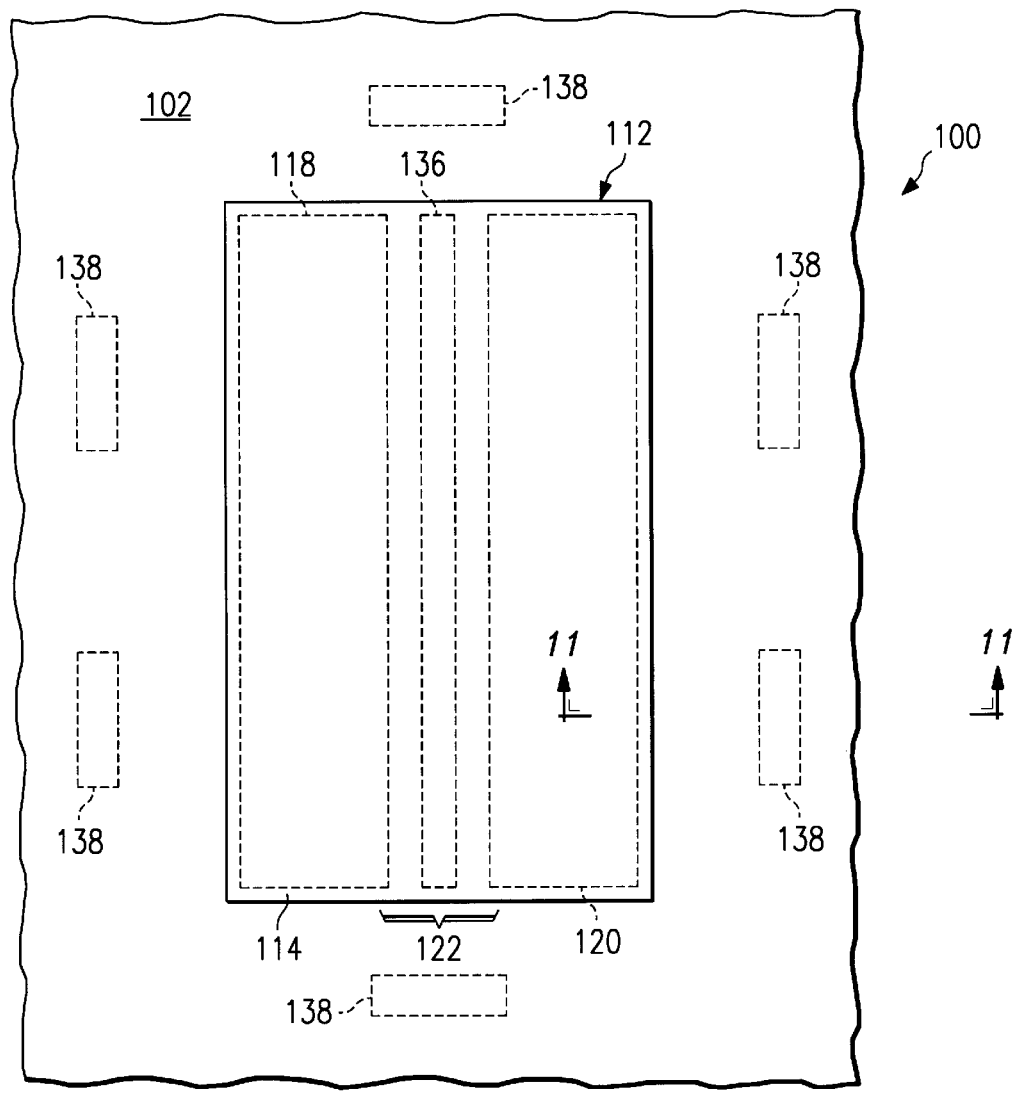
FIG. 10 is a schematic plan view of a variable capacitor in a semiconductor device according to another embodiment of the present invention.

Referring to FIGS. 10 and 11, a modified structure 112 for the variable capacitor of the present invention will be described. The modified variable capacitor 112 is integrated as part of a semiconductor device 100, with similar elements designated by reference numerals similar to those previously employed. The variable capacitor 112 has spaced-apart conductive plates 118 and 120 defining a gap 122 therebetween. This embodiment includes a substrate 124 and an insulating layer 128 that are similar to respective elements 24 and 28 of the previously described embodiment. In the same manner as for the variable capacitor 12 previously described, a flexible membrane 114 includes a beam portion 136 that moves up and down in the gap 122 between the plates 118 and 120. The cavity or space 134 between the flexible membrane 114 and a second insulating layer 130 is formed in a similar manner to that previously described by etching out a PSG layer (not shown). However, in this modified embodiment, ports 138 are removed from over the plates 118 and 120 and located at the periphery as shown in FIG. 10. After the PSG has been laterally etched and flushed out of the space 134 beneath the membrane 114, an additional dielectric layer 102 is deposited and patterned to lie over the peripheral portions of the variable capacitor 112, thus covering the etch ports 138 as shown in FIG. 11. The dielectric layer 102 may be any suitable material such as a conventional glass passivation or a polyimide material.

With the etch ports 138 covered, contaminants cannot enter the space 134 beneath the membrane 114. However, this will also cause the membrane 114 to be less flexible due to the air cushion beneath it. Therefore, the modified variable capacitor 112 will exhibit different electrical characteristics from the variable capacitor 12 previously described. The variable capacitor 112 may be more suitable for use as a pressure-sensitive device that is physically contacted. An array of such capacitors 112 would have useful application as a fingerprint detector. An example of a capacitor array used as a fingerprint detector is described in U.S. Pat. No. 5,325,442. Similarly, an array constructed in accordance with the present invention can provide a fingerprint image when contacted by a human finger. The varying pressure of the ridges and valleys of a finger can be sensed by reading the isolated capacitor values at array locations using sequential row scanning and column sensing. A read enable transistor can be included at each variable capacitor location, and row and column access can be provided through the substrate and by conductors above the substrate in a manner similar to that used in conventional memory products.

The preferred variable capacitor embodiments 12 and 112 of the present invention can be employed in various applications including, by way of example, vibration sensors, accelerometers, pressure sensors, and acoustic transducers.

Figure 12:
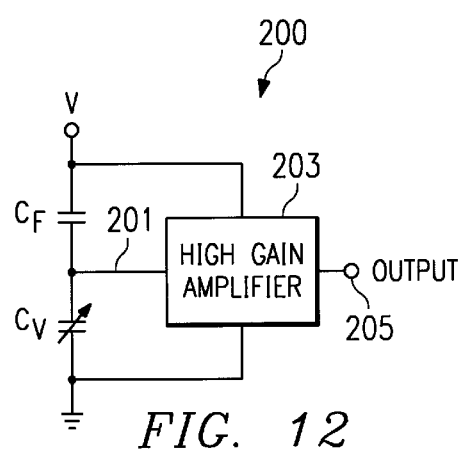
FIG. 12 is a circuit diagram illustrating circuitry for detecting the variations in capacitance of a variable capacitor of the present invention.

Most such applications of the variable capacitor of the present invention will require amplification of a signal produced by the variable capacitor. With reference to FIG. 12, a simplified circuit 200, which includes elements of an integrated circuit formed on the same semiconductor substrate as the inventive variable capacitor, will be described. The circuit 200 enables sensing and amplifying of a voltage signal that varies with the capacitance variations of the variable capacitor, which is designated by reference character $C_v$. The variable capacitor $C_v$ is connected in series with a fixed-value capacitor $C_f$ between a positive voltage supply V and ground connection. A sense node 201 is defined at the connection between the variable capacitor $C_v$ and the fixed-value capacitor $C_f$. The signal on the sense node 201 is amplified by a high gain amplifier 203 producing an output 205 that reflects the variations in the capacitance of the variable capacitor $C_v$ during operation. The output 205 is applied to other circuitry (not shown) that is configured depending on the particular application.

Figure 13:
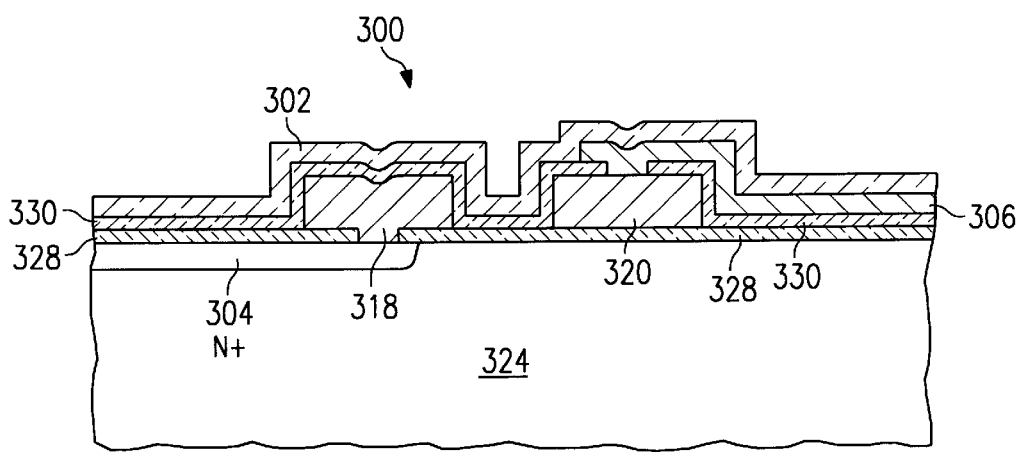
FIG. 13 is a schematic cross-section through capacitor plate extensions showing connections thereto in a semiconductor device in which a variable capacitor of the present invention is integrated with other circuit elements of the device

It will be appreciated that integration of a variable capacitor of the present invention as part of a conventional integrated circuit device is readily achieved using conventional semiconductor processing technology. Referring to FIG. 13, a portion of an integrated circuit device 300 is shown in which suitable contacts are made to an embodiment of the variable capacitor similar to those previously described. In this example, the substrate 324 is lightly doped P-type and includes an N+ doped region 304 that makes contact to capacitor plate 318, which has a connecting portion extending through an opening in insulation layer 328. The N+ region 304 may conveniently define a ground line connection in the device 300. A conductor 306 preferably formed in a second-level metal layer is used to make contact to the top surface of capacitor plate 320 through an opening in insulation layer 330. A conventional passivation layer 302 covers the device. The capacitor plates 318 and 320 in FIG. 13 may be extensions of modified conductors 18 and 20 of FIG. 1 extending beyond the periphery 32 of the embodiment of FIG. 1. Those skilled in the art will appreciate that the interconnection scheme illustrated in FIG. 13 is merely one of various different techniques that can be used to make contact to variable capacitor plates in an integrated circuit device such as device 300.

Although a preferred embodiment of the invention has been described in detail, it is to be understood that various changes, substitutions and alterations can be made therein without departing from the spirit and scope of the invention as set forth in the appended claims.

What is claimed is:

1. A variable capacitor formed as part of a semiconductor device structure, comprising:
   (a) a semiconductor substrate;
   (b) an insulating layer supported by said semiconductor substrate;
   (c) a first conductor disposed on said insulating layer defining a first plate of the variable capacitor;
   (d) a second conductor disposed on said insulating layer defining a second plate of the variable capacitor, said first and second conductors being spaced apart from each other to define a gap therebetween;
   (e) a flexible membrane supported at its periphery by said semiconductor substrate, said flexible membrane comprising dielectric material and including a portion extending into and moveable in the gap between said first and second conductors to change the capacitance of the variable capacitor.

2. The variable capacitor of claim 1 further comprising contacts for connecting said first and second conductors to elements of an integrated circuit formed on said semiconductor substrate.

3. The variable capacitor of claim 1 wherein said first and second conductors have a thickness of approximately 0.5 to 3 microns.

4. The variable capacitor of claim 1 wherein said flexible membrane consists essentially of silicon nitride.

5. The variable capacitor of claim 1 wherein said flexible membrane consists essentially of polyimide.

6. A semiconductor device including a variable capacitor, comprising:
   (a) a semiconductor substrate;
   (b) a first conductor supported by said semiconductor substrate defining a first plate of the variable capacitor;
   (c) a second conductor supported by said semiconductor substrate defining a second plate of the variable capacitor, said first and second conductors being spaced apart from each other to define a gap therebetween; and
   (d) a beam of dielectric material moveable into and within said gap in response to an external stimulus, whereby movement of said beam effects a change in the capacitance of the variable capacitor.

7. The semiconductor device of claim 6 further comprising:
   (a) a flexible membrane connected to said beam, said flexible membrane supported at its periphery by said semiconductor substrate; and
   (b) contacts connecting said first and second conductors to elements of an integrated circuit formed on said semiconductor substrate.

8. The semiconductor device of claim 7 wherein said flexible membrane includes portions defining one or more ports.

9. The semiconductor device of claim 8 wherein said ports overlie said first and second conductors.

10. The semiconductor device of claim 8 wherein said ports are formed at the periphery of the variable capacitor.

11. The semiconductor device of claim 10 further comprising a dielectric layer formed over selected portions of said flexible membrane, said dielectric layer covering the ports defined by said flexible membrane.

12. The semiconductor device of claim 11 wherein said dielectric layer consists essentially of a conventional glass passivation material.

13. The semiconductor device of claim 11 wherein said dielectric layer consists essentially of polyimide.

14. The semiconductor device of claim 7 wherein said first and second conductors include extensions that provide contacts with elements of an integrated circuit formed together with the variable capacitor on said semiconductor substrate.

15. The semiconductor device of claim 6 further comprising:
   (a) a fixed-value capacitor connected in series with the variable capacitor;
   (b) a sense node defined at the connection between said fixed-value capacitor and the variable capacitor; and
   (c) a high gain amplifier connected to said sense node, said amplifier capable of producing an output reflecting variations in the capacitance of the variable capacitor during operation.

* * * * *

UNITED STATES PATENT AND TRADEMARK OFFICE
CERTIFICATE OF CORRECTION

PATENT NO. : 5,982,608
DATED : November 9, 1999
INVENTOR(S) : Alexander Kalnitsky et al.

It is certified that error appears in the above-identified patent and that said Letters Patent is hereby corrected as shown below:

On the Title Page: Item [75] Inventors: change "Bhusian Guptz" to --Bhusan Gupta--.

Signed and Sealed this

Twenty-third Day of May, 2000

Attest:

Q. TODD DICKINSON

*Attesting Officer*      *Director of Patents and Trademarks*